Patented Feb. 21, 1950

2,498,353

UNITED STATES PATENT OFFICE 2,498,353

PROCESS FOR MAKING ACTIVATED MAGNESIUM SILICATES

Ernest C. Bierce, Pasadena, Calif.

No Drawing. Application December 23, 1946, Serial No. 718,117

5 Claims. (Cl. 23—110)

This invention relates to the production of synthetic magnesium silicate in a form which is commercially active as a decolorizing material.

Decolorizing materials containing magnesium silicate made by the well known process of base exchange have heretofore been used for decolorizing mineral and vegetable oils, but in the particular physical forms in which the magnesium silicates have thus been available, the products are relatively slow filtering even under high pressure in a filtering press, and characteristically retain large amounts of oil in the filter cake. In my co-pending application, Ser. No. 697,383, filed September 16, 1946, I have disclosed a method of producing a rapid filtering, low oil retention decolorizing magnesium silicate made by a process consisting generally of making, first, a hydrated amorphous silica, and then converting this hydrated amorphous silica into magnesium silicate having a physical structure which makes it highly active and satisfactory as a decolorizing material. My present invention is an improvement over the previous invention, particularly as to the simplified process and consequent lowered cost of making the highly active form of magnesium silicate.

One object of this invention is to provide a simple and inexpensive improved method for making activated decolorizing magnesium silicate. Another object is to provide a method for making magnesium silicate material having superior decolorizing action upon oil, which is fast filtering, and retains a minimum amount of oil in a filter cake. Still another object is to make activated magnesium silicate from sodium silicate.

In general, I have discovered that these objects may be attained by adding to an aqueous sodium silicate solution, a water-soluble acid or water soluble salt in an amount to produce incipient formation of a precipitate, and then adding a water-soluble magnesium salt such as magnesium chloride or sulfate in sufficient amount to produce, upon heating, an active form of insoluble magnesium silicate.

It is well known that the addition of a water-soluble magnesium salt, for example, magnesium chloride, to a water solution of sodium silicate, results in the precipitation of magnesium silicate, but the material thus formed has little, if any, value as a decolorizing agent for oils. By following the general process of my invention as above outlined, I have produced magnesium silicate material which has high decolorizing efficiency, and desirable physical properties, and at minimum cost of manufacture.

Illustrating the preferred method of practicing my invention, I have, for example, prepared a solution containing about two parts by weight of 40° Baumé sodium silicate ($1Na_2O:3.22SiO_2$) in 5 parts by weight of water. To this solution, at room temperature, I added about one part of sodium chloride. No visible change took place. The mixture was then heated to 150° F. or higher when a slight haze or precipitate appeared in the liquid, at which time an amount of aqueous magnesium chloride solution equivalent to the silicate present was added, and the mixture boiled for about one hour. Activated decolorizing magnesium silicate was precipitated. The precipitate was separated from the water solution, washed to free it from soluble salts, and dried. The product was a highly efficient decolorizing material for treating oils. By comparative tests with the best available commercial decolorizing powders, the product is much superior in decolorizing efficiency, is of higher flow rate, and less oil is retained in the filter cake than is the case with available commercial decolorizing materials.

The formation of the initial precipitate may be produced in an aqueous sodium silicate solution by the addition of soluble acids, or salts of soluble acids in amounts less than the amount required to completely precipitate hydrated amorphous silica. I have found that hydrochloric acid, sulfuric acid, carbonic acid, sodium chloride, sodium carbonate, or sodium sulfate will produce a small initial precipitate in sodium silicate solutions and will give satisfactory results in my process. They may be used interchangeably, the most economical material in general being selected to keep the cost of producing the decolorizing material as low as possible. The amount added need not be great enough to produce visible precipitation; an appearance of mere haze is enough. The addition of the acid or the salt before the addition of the soluble magnesium salt appears to avoid the formation of the inactive form of magnesium silicate which otherwise forms on the simple addition of magnesium salt to sodium silicate solution, as previously mentioned.

Sodium or other soluble silicates having the proportions of base to silica widely different from that given in the illustrative example may also be used.

Other water soluble salts of magnesium may be used in place of magnesium chloride, such as magnesium sulfate, etc.

The decolorizing product made by my new process is not only a more efficient decolorizing agent than those commercially available, but it is less retentive of oil, and has a higher flow rate.

My new process makes its production more economical by reducing the number of operating steps, and in reducing the time of boiling to produce the activated form of the magnesium silicate.

I claim:

1. The process of making magnesium silicate of high decolorizing capacity comprising mixing an aqueous solution of sodium silicate with a precipitant selected from the group consisting of a water soluble mineral acid and an alkali metal salt of a mineral acid in an amount less than that required to initiate precipitation of an insoluble precipitate at the temperature of the mixture, heating the mixture until an insoluble precipitate begins to form, then adding a water soluble magnesium salt, and continuing the heating until magnesium silicate is formed.

2. The process of making highly active decolorizing magnesium silicate comprising mixing an aqueous solution of sodium silicate with sodium chloride, heating the mixture until a precipitate begins to form, adding magnesium chloride, and then heating the mixture until magnesium silicate is formed.

3. The process of making highly active decolorizing magnesium silicate comprising mixing an aqueous solution of sodium silicate with an amount of sodium chloride less than that required to initiate formation of an insoluble precipitate at the temperature of the mixture, heating the mixture until an insoluble precipitate begins to form, then adding a water-soluble magnesium salt, and continuing the heating until magnesium silicate is formed.

4. The process of making highly active decolorizing magnesium silicate comprising mixing an aqueous solution of sodium silicate with an amount of sodium carbonate less than that required to initiate formation of an insoluble precipitated at the temperature of the mixture, heating the mixture until an insoluble precipitate begins to form, then adding a water-soluble magnesium salt, and continuing the heating until magnesium silicate is formed.

5. The process of making highly active decolorizing magnesium silicate comprising mixing an aqueous solution of sodium silicate with an amount of hydrochloric acid less than that required to initiate precipitation of hydrated amorphous silica at the temperature of the mixture, heating the mixture until incipient hydrated amorphous silica forms, then adding a water-soluble magnesium salt, and continuing the heating until magnesium silicate is formed.

ERNEST C. BIERCE.

REFERENCES CITED

The following references are of record in the file of this patent:

UNITED STATES PATENTS

| Number | Name | Date |
|---|---|---|
| 1,999,210 | Rembert | Apr. 30, 1935 |
| 2,390,556 | Ruthruff | Dec. 11, 1945 |

OTHER REFERENCES

Joffe et al.: "Laws of soil colloidal behavior: XVII, Magnesium silicate, its base exchange properties," Soil Science, vol. 40 (1935), pages 257-259.

Ordway: American Journal of Science and Arts, 2nd series, vol. 35, pp. 185-195.